United States Patent
Chamoy

(10) Patent No.: US 6,916,163 B2
(45) Date of Patent: Jul. 12, 2005

(54) DEVICE FOR TREADING A TIRE CARCASS

(75) Inventor: François Chamoy, Chamaliéres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 138 days.

(21) Appl. No.: 10/392,523

(22) Filed: Mar. 20, 2003

(65) Prior Publication Data

US 2003/0211186 A1 Nov. 13, 2003

Related U.S. Application Data

(63) Continuation of application No. PCT/EP01/10899, filed on Sep. 20, 2001.

(30) Foreign Application Priority Data

Sep. 22, 2000 (FR) .............................................. 00 12248

(51) Int. Cl.[7] .............................................. B29D 30/54
(52) U.S. Cl. .......................... 425/20; 156/909; 425/24; 425/39
(58) Field of Search .............................. 425/20, 24, 36, 425/39; 156/96, 909

(56) References Cited

U.S. PATENT DOCUMENTS

| 3,793,116 A | * | 2/1974 | Schelkmann | 156/909 |
| 3,802,978 A |   | 4/1974 | Barnett | 156/96 |
| 3,884,740 A | * | 5/1975 | Schelkmann | 156/96 |
| 3,895,985 A |   | 7/1975 | Schelkmann | 156/96 |
| 3,935,045 A | * | 1/1976 | Wolfe | 156/96 |
| 3,983,193 A |   | 9/1976 | Wulker | 264/36 |
| 4,053,265 A |   | 10/1977 | Wulker | 425/20 |
| 4,123,306 A |   | 10/1978 | Landry | 156/96 |
| 4,185,056 A | * | 1/1980 | Detwiler | 264/315 |
| 4,309,234 A | * | 1/1982 | Witherspoon | 156/96 |
| 4,529,367 A | * | 7/1985 | Fike | 425/24 |
| 5,098,268 A |   | 3/1992 | Robinson | 425/14 |
| 5,518,384 A | * | 5/1996 | Presti et al. | 425/36 |

FOREIGN PATENT DOCUMENTS

FR          2790994          9/2000

OTHER PUBLICATIONS

U.S. Appl. No. 2002/0040755, filed Apr. 11, 2002.

* cited by examiner

Primary Examiner—James P. Mackey
(74) Attorney, Agent, or Firm—Fitzpatrick, Cella, Harper & Scinto

(57) ABSTRACT

The invention relates to a device for treading a vulcanized tire carcass using an uncured tread comprising a rim (6) for mounting the carcass, an elastic annular mold (7) whose circumferential outer surface is covered with an elastic sleeve (16), the mold being intended to mold the uncured tread (3), the device comprising two disc-shaped elastic flanges (8, 9) intended to cover, respectively, one sidewall of the assembly composed of the constituted tire covered with the mold (7), the larger-diameter peripheral end (82, 92) of each flange (8, 9) bearing a rigid annular member (33) for connection with the sleeve (16) covering the mold (7).

8 Claims, 3 Drawing Sheets

DEVICE FOR TREADING A TIRE CARCASS

CROSS REFERENCE TO RELATED APPLICATIONS

This is a continuation of international application PCT/EP01/10899 filed Sep. 20, 2001, which was published in French on Mar. 28, 2002 as international publication WO 02/24438 A1 and which claims priority of French application 00/12248 filed Sep. 22, 2000.

BACKGROUND OF THE INVENTION

1. The Field of Invention

The invention relates to a process for treading vulcanized tire carcasses. Nowadays, use is made of these processes generally in the context of retreading but, obviously, everything that will be stated hereinbelow is valid for the treading of new tire carcasses.

2. The Related Art

Two main types of retreading processes exist: one, commonly known as "cold retreading", consisting in using a precured tread that is placed on a carcass ready to be retreaded, and then in curing the assembly using heating means such as an oven; the other process, known as "hot retreading", consists in placing an uncured tread, in the form especially of sheets, strips or a profile, on a carcass ready to be retreaded, and then in curing the assembly in a mold.

These hot retreading processes apply in particular to the retreading of large-sized tires, such as tires intended for heavy vehicles, agricultural machines, civil engineering vehicles, etc., for which problems of handling and deformation of the treads make it difficult to use them in a precured form. The invention lies in the field of hot retreading.

Among the processes for hot retreading, U.S. Pat. No. 4,053,265 describes a process that consists in using an elastic annular mold, preferably made of rubber, intended for molding and vulcanizing the tread. This elastic mold is placed on the tire carcass to be retreaded, which has been covered beforehand with an uncured tread, the mold-carcass assembly then being entirely enveloped with a membrane that ensures leaktightness. This assembly is then placed in an oven for curing after creating a vacuum in the membrane.

More specifically, in order to be able to ensure perfect leaktightness between the carcass, the tread and the elastic mold, as shown in U.S. Pat. No. 4,053,265 (FIG. 2), it is necessary to envelop the carcass covered with the mold using two elastic membranes: one membrane, known as the "inner membrane", which extends from the outer surface of the sidewalls over the entire inner surface of the carcass, and a second membrane known as the "outer membrane", which is covered by the first membrane on the outer surface of the sidewalls, or vice-versa, so as to ensure continuity of the leaktightness between the two membranes. The outer membrane thus covers the entire outer surface of the mold and the portion of the sidewalls not covered by the inner membrane.

These membranes are particularly difficult to install. The reason for this is that it is necessary to stretch the outer membrane very strongly in order for it to be able to cover all of the tread and the sidewalls, this operation being made even more difficult by the fact that the tires involved are generally of a large size. This problem of installation furthermore entails a very high rate of wear of the outer membrane, which is subjected to large elastic stresses and frequent risks of tearing, the consequence of which is that it is necessary to change the membranes frequently, not to mention the risks of using a damaged membrane that would generate defects in the tire produced.

U.S. Pat. No. 4,053,265 proposes an alternative to the use of the two membranes, which consists in using an outer membrane identical to that in the first solution, except that it uses an O-ring seal to achieve the leaktightness at the sidewalls and a membrane inside the tire in the form of an inner tube connected to a support disc of the tire. It is clear that this solution does not solve the abovementioned problems associated with the use of the outer membrane, and that, furthermore, this solution does not make it possible to achieve good leaktightness unless the O-ring seals are vulcanized onto the sidewalls of the tire carcass, which is problematic.

Applicant's commonly-owned U.S. patent application Ser. No. 09/956,154, filed on Sep. 19, 2001 and published on Apr. 11, 2002 as US-2002-0040755-A1 (and issued as U.S. Pat. No. 6,824,633 B2), describes a device for treading a vulcanized tire carcass using an uncured tread comprising a mounting rim and an elastic annular mold for molding the tread. This device also comprises two elastic flanges intended to cover, respectively, the outer surface of the tire thus made, between a bead of the tire and the peripheral edge of the corresponding mold, each flange being extended on its larger-diameter peripheral end with an elastic sleeve covering the shoulders and partially the crown of the elastic mold.

Such a device makes it possible to overcome the drawbacks mentioned above, but the problem of the longevity of such flanges remains. The reason for this is that the flanges used in this device must at the same time ensure very good leaktightness and have great elasticity. These properties are particularly demanded during the curing stage where, since the elastic mold enters the rubber tread mix, its diameter decreases and the flanges, or more specifically their extensions in the form of sleeves covering the crown of the mold, must follow these variations in diameter while continuing to ensure leaktightness. Rubbers that allow this compromise of properties do not allow the flanges to be used for more than about ten cycles.

The present invention is directed towards overcoming all of the abovementioned drawbacks.

SUMMARY OF THE INVENTION

It has been discovered, surprisingly, that by moving away from the principles mentioned above and by using for the flanges rubber mixes that are, on the contrary, more rigid, and by structurally modifying the device, a solution is reached that is reliable and much more durable, while nevertheless preserving the leaktightness that is essential for the functioning of such a device.

According to the invention, the device for treading a vulcanized tire carcass using an uncured tread comprises a rim for mounting the carcass, an elastic annular mold whose circumferential outer surface is covered with an elastic sleeve, the mold being intended to mold the uncured tread. The device also comprises two disc-shaped elastic flanges intended to cover, respectively, one sidewall of the assembly composed of the constituted tire covered with the mold, the larger-diameter peripheral end of each flange bearing a rigid annular member for connection with the sleeve covering the mold. Specifically, this connection via a rigid member combined with the elastic properties of the flanges makes it possible to obtain a device that is simple to install and that has good wear resistance.

Advantageously, each rigid annular member makes an elastic connection between the sleeve covering the mold and the flange bearing the member. The elasticity of this connection ensures its leaktightness during variations in the diameter of the mold in the course of the various curing phases.

Furthermore, it is advantageous, especially in order to be able to have good wear resistance and easy installation of the flanges, which are, as has been stated, discs covering the sidewalls of the assembly formed by the tire and the mold, for the flanges to be elastic but nevertheless to have a certain level of rigidity and continuing to ensure the leaktightness, such as flanges made of butyl rubber.

BRIEF DESCRIPTION OF THE DRAWINGS

Other advantages and characteristics of the invention will emerge from the following description of illustrative examples of a retreading device in accordance with the invention, with reference to the attached drawings, in which.

DETAILED DESCRIPTION OF EXEMPLARY EMBODIMENTS

Figure 1:
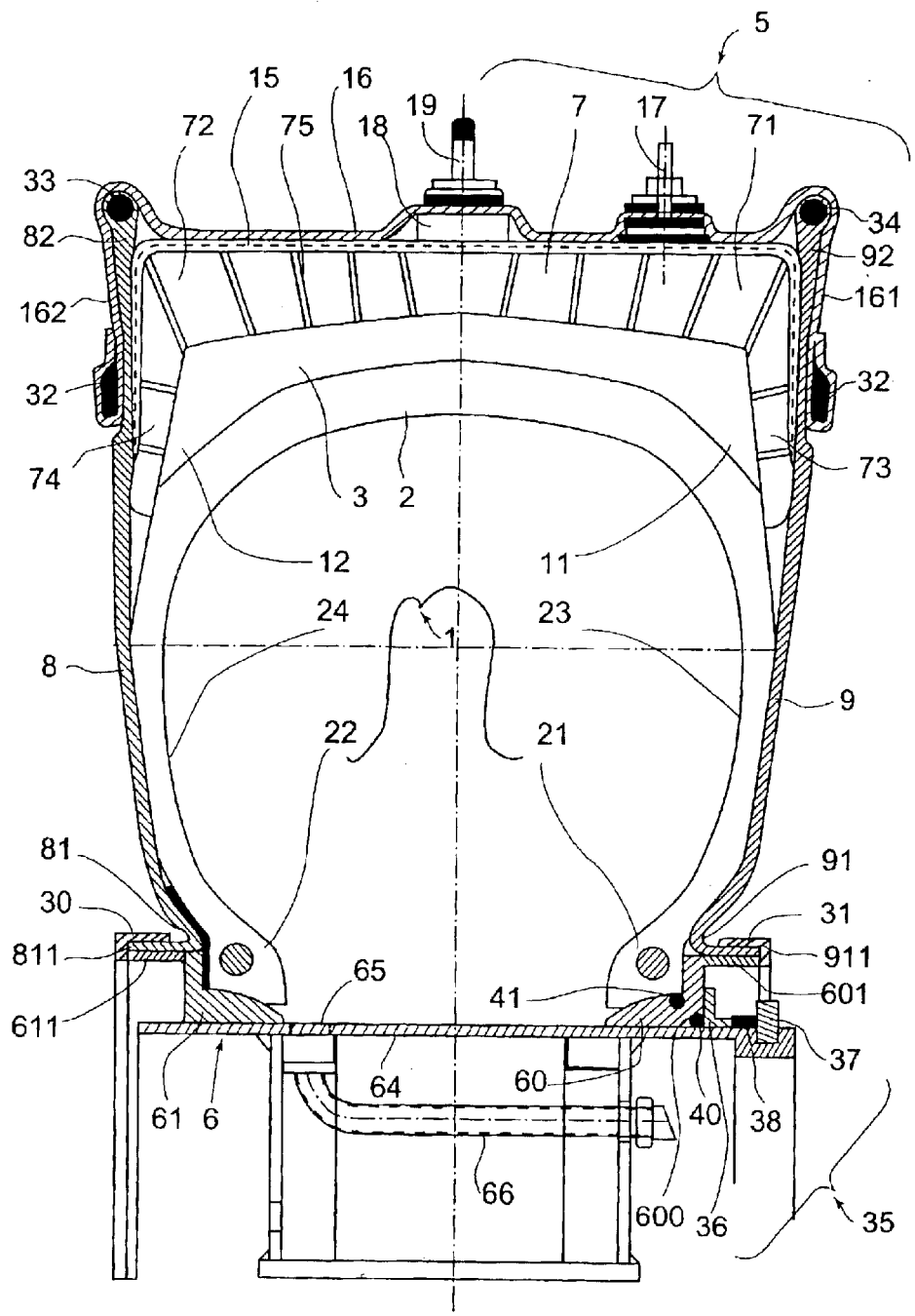
FIG. 1 is a partial radial cross section of an embodiment of a retreading device in accordance with the invention.

In the text hereinbelow, the members that are common to the various embodiment variants of the retreading device are denoted by the same reference with the added symbol '.

A tire 1 to be retreaded will be considered, comprising a carcass 2 especially comprising two beads 21, 22 and two sidewalls 23, 24 covered with an uncured tread 3, the tread having been placed on the carcass 2 by any suitable means, and shoulders 11, 12 connecting the crown of the tread 3 to the sidewalls 23, 24.

According to FIG. 1, the retreading device 5 comprises a rim 6 onto which the tire 1 must be mounted, an elastic annular mold 7 for molding the tread 3 and two disc-shaped elastic flanges 8(8') and 9(9') intended to cover the sidewalls of the assembly consisting of the tire 1 covered with the mold 7 so as to ensure the leaktightness of the tire carcass 2, tread 3, elastic mold 7 and rim 6 assembly. The retreading device installed on a tire is intended to be placed in a heated and pressurized chamber such as an oven.

The elastic mold 7 is in the form of a ring whose inner surface defines the molding of the tread and which has annular peripheral edges 71, 72 which extend in the form of wings 73, 74 intended to cover, respectively, the shoulders 11, 12 of the tire 1.

The annular mold 7 must be sufficiently elastic in a direction oriented radially outwards, and must withstand the heat of vulcanization without becoming deformed. The mold must also withstand being subjected to several heating cycles and must have good tear strength. It is possible, for example, in order to form this annular mold, to use an elastomer that is suitable to obtain the above properties.

Thus, when the mold 7 is stretched, its inside diameter is greater than the outside diameter of the tire 1 comprising the uncured tread 3, thus allowing the mold 7 to be installed on the said tread.

Such a mold may be made, for example, in accordance with the process presented in U.S. Pat. No. 3,983,193 in which a new tire is used as a "molding block", which is covered with an uncured vulcanizable rubber tread. The assembly thus made is placed in an oven, after having been placed under vacuum by means of a membrane surrounding this assembly, for the purpose of vulcanizing the mold. The molding motif appearing on the inner surface of the mold corresponds to the negative of the tread design of the tread of the new tire used.

Once the mold 7 is removed from its "molding block", it is necessary to pierce into the mold vents 75 which extend radially through the thickness of the mold for the future use of the mold, so as to allow evacuation of the air that is between the mold and the carcass to be retreaded covered with an uncured tread during the molding and vulcanization of this tread.

In order to limit and control the penetration of the mold 7 into the tread, metallic inserts 18 may be provided inside the mold, distributed along the circumference of the mold, and such that these inserts together form a crown whose sectors abut in the compressed position of the mold. Furthermore, the metallic inserts may allow traction rings 19 to be attached so as to facilitate the operations for stripping out the cured tire.

Figure 2:
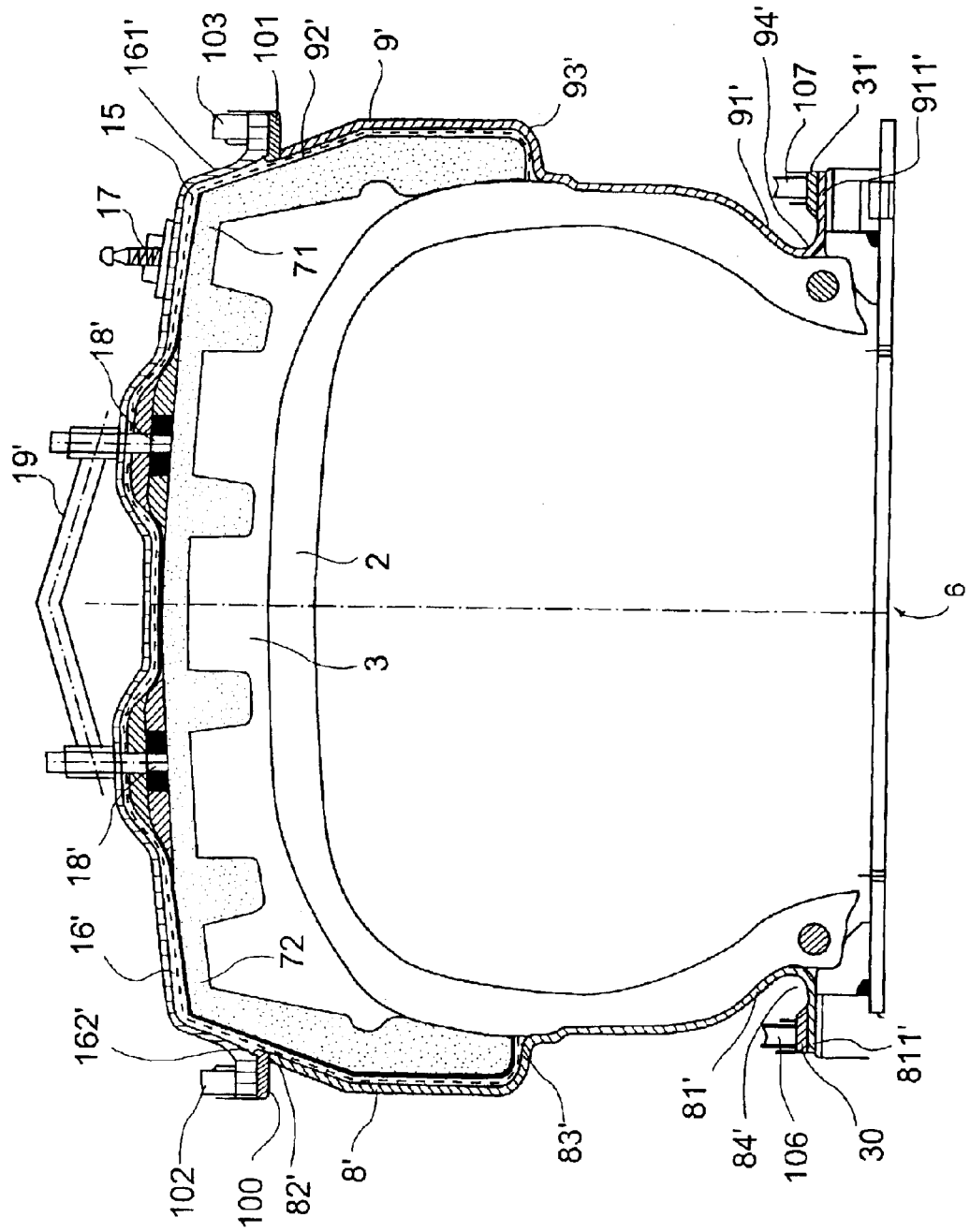
FIG. 2 is a partial radial cross section of a variant of the embodiment of the retreading device shown in FIG. 1.
Figure 3:
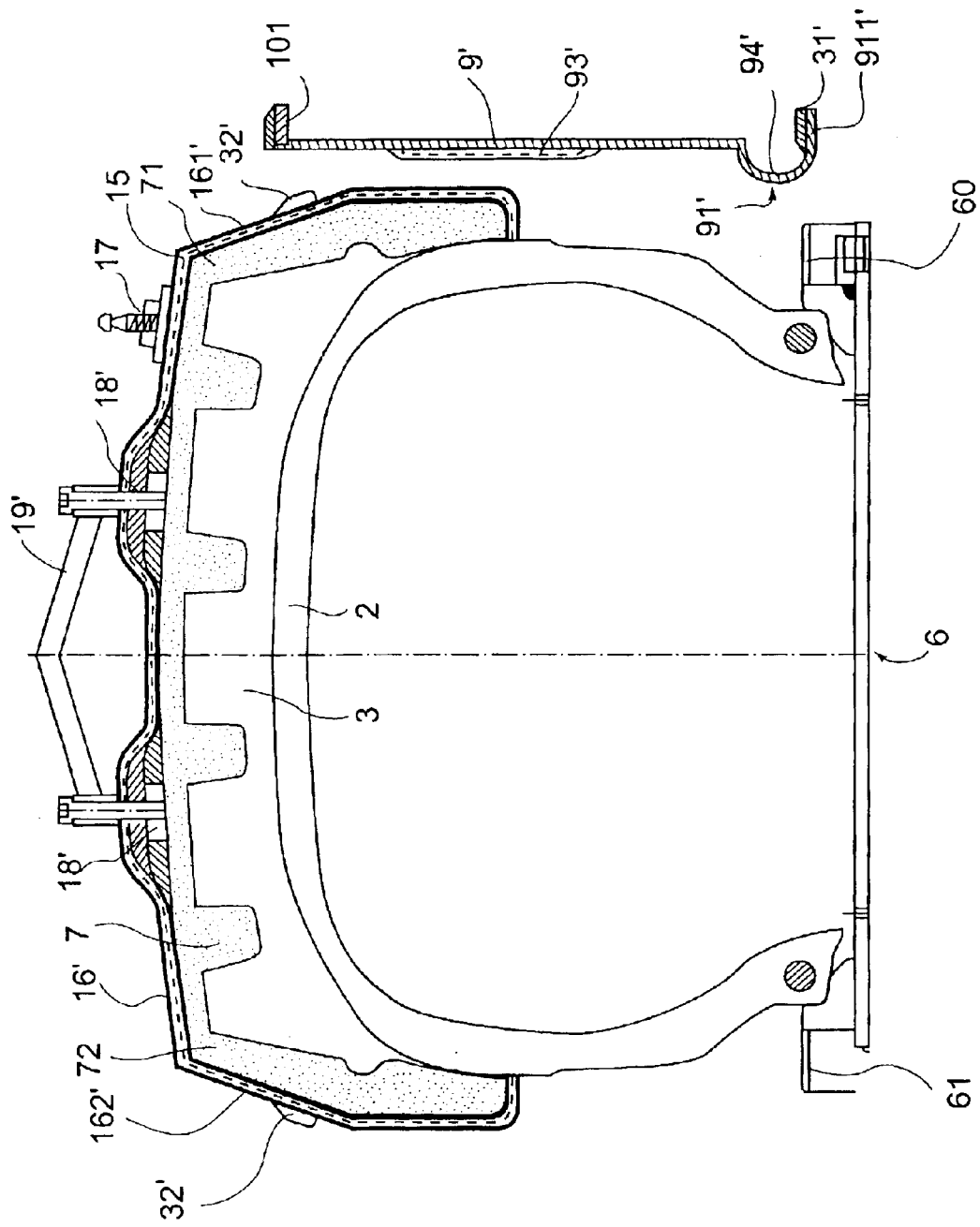
FIG. 3 is a partial radial cross section of the embodiment variant of FIG. 2, partially exploded.

According to the embodiment variant represented in FIGS. 2 and 3, inserts 18' may also be provided along two circumferential trajectories so as to allow the positioning of handles 19' by screwing.

The outer circumferential surface of the annular mold 7 is covered with a first elastic draining sleeve 15, for evacuating the air via drains, which may be placed directly on the mold. This draining sleeve 15 may be fastened to the mold 7.

The draining sleeve 15 is itself covered with a leaktight elastic sleeve 16(16') made of a vulcanized elastomeric mix. A non-return valve 17 is incorporated into the elastic sleeve 16(16') so as to be able to establish the vacuum and maintain it. An anti-extrusion grid, not shown, made of expanded metal may be provided under the valve 17 to avoid any risk of the valve becoming embedded in the rubber of the mold.

According to a first embodiment of the invention shown in FIG. 1, the sleeve 16 has peripheral wings 162, 161 intended to cover the large-diameter peripheral ends of each flange 8, 9 so as to produce a leaktight connection between each flange 8, 9 and the sleeve 16. The free end of each of the wings 161, 162 bears a radial tension device 32 attached or vulcanized thereon.

The flanges 8, 9 are made of a leaktight elastic material, thus making it particularly advantageous to use rubber materials, which achieve a good compromise between heat resistance and elasticity. Furthermore, a material is also desired which, while offering good elasticity, has a certain level of rigidity, allowing the flanges especially, as will be seen more specifically hereinbelow, to have better wear resistance. It may thus be chosen to make the flanges from butyl rubber, which has all of these properties.

Each flange 8, 9 has a small-diameter peripheral end 81, 91 intended to be positioned on the rim 6 in contact with rim beading, and a large-diameter peripheral end 82, 92 whose diameter is slightly greater than or equal to that of the mold 7 at rest.

The small-diameter end 81 (91) of the flange 8 (9) is maintained in leaktight contact with the corresponding rim beading 61 (60) by forming a cylindrical flange 811 (911) in contact with a surface 611 (601) borne by the corresponding rim beading. Each flange 811, 911 is maintained on the surface 611, 601, respectively, by means of a flat ring 30, 31 arranged on each flange. This ring may especially be made of silicone.

According to one variant, not shown, it is possible to envisage at the smaller-diameter ends 81 and 91 of the flanges 8 and 9 the formation of a bellows for accepting certain variations in the diameter of the flanges without prompting them to extend. The reason for this is that the elasticity of the material of which the flanges are made may be insufficient in certain cases since it is limited, as has been pointed out previously.

To the large-diameter end 82 (92) is attached, respectively, an annular connecting member 33 (34) for providing an elastic connection with the sleeve 16, this rigid member 33 (34) possibly being coated with a rubber mix which may directly be the end of the flange, so as to preserve the leaktightness of the connection.

One embodiment variant of the device is shown in FIGS. 2 and 3. FIG. 2 illustrates the device in place on the carcass, while in FIG. 3 the flanges 8' and 9' are not in position, the flange 9' being approached before its installation on the carcass and the mold.

The sleeve 16' has peripheral wings 162', 161' intended to cover the shoulders 72 and 71 of the mold 7. The free end of each of the wings 161', 162' bears a flat rubber ring 32', 32 vulcanized thereon and intended to engage with a rigid metal ring 101, 100 borne by each flange 9', 8' as shown in FIG. 3.

Once the members of the device are in position on the carcass-tread assembly, each flat ring 32' bears against the corresponding rigid ring 100 (101), thus causing the end 161' (162') bearing the flat ring to turn up, as shown in FIG. 2, each assembly being maintained by a belt 102 (103) extending circumferentially and locked by a quick-closing tension device. Preferably, the metal rings are rubber-coated to ensure that the connection is leaktight.

The flanges 8', 9' are made of an elastic material as specified for the first embodiment of the invention.

Each flange 8', 9' has a small-diameter peripheral end 81', 91' intended to be positioned on the rim 6 in contact with rim beading, and a large-diameter peripheral end 82', 92' whose diameter is less than that of the mold 7 at rest. The rigid metal ring 100, 101 is attached to the large-diameter end 82' (92'), respectively.

The small-diameter end 81' (91') of the flange 8' (9') is maintained in leaktight contact with the corresponding rim beading 61 (60) forming a cylindrical flange 811' (911') bearing a flat rubber ring 30, 31', in contact with a surface borne by the rim. Each flange 811', 911' is maintained on the rim by a belt 106 (107) locked by a quick-closing tension device.

As shown in FIG. 3, the small-diameter end 91' of the flange 9' (and symmetrically for the flange 8') bears a shield 94' (84') for withstanding the tensions and deformations suffered by the flanges due to the action of the pressure of the autoclave at the time of curing.

Advantageously, a portion 83' (93') of each flange 8' (9') is reinforced with aramid cords arranged parallel to each other in the radial direction so as to avoid, during molding in which the mold becomes embedded in the tread, a portion of the flange from becoming inserted between the mold and the tire carcass. Thus, this reinforced region is located in the overlap of the end of the wings of the mold and of the sidewalls of the tire.

Moreover, whichever variant is considered, the device 5 also comprises, as has been stated previously, a rim 6 on which the tire carcass is mounted and inflated. Specifically, it is important that the tire is inflated during the installation of the elastic mold 7 on the tread, in order, firstly, to ensure a resistance to the pressure that will be exerted by the mold on the tire, and, secondly, to have a uniform presentation of the tire with respect to the mold so as to facilitate its installation and centering on the tread.

Moreover, good leaktightness needs to be ensured between the carcass and the rim, in particular when the fluid used in the oven is steam. Specifically, in this case, if leaktightness is not ensured, water accumulates inside the tire, entailing risks of non-uniform curing of the tire.

Ensuring such a leaktightness does not pose any major difficulties in the case of treading a new tire carcass, but the problem is more difficult as regards retreading due to the deformation of the tire beads. The reason for this is that the beads of these tires that have already been mounted have, in a known manner, been subjected to a deformation that consists of a narrowing together of the two beads. It is therefore not possible to use a usual rim corresponding to the tire as a support for mounting the carcass covered with the retreading device, since the spacing between the beads has changed.

One solution consists in using for the retreading a rim fitted with an inner tube. The drawback of this solution, besides the fact that it requires the use of an additional membrane consisting of the inner tube, lies in the fact that it is necessary to use a rim whose size corresponds to that of the tire to be retreaded, and thus a rim for each size (which is also the case when using an ordinary rim for the treading of a new tire carcass).

The rim described below allows for easy mounting and removal of the tire without requiring the presence of an inner tube, which allows the same rim to be adapted to tires of the same size diameter but of different widths within a given range. Thus, the tire carcass to be treated is inflated on this rim by the direct action of a fluid on the inner walls of the said carcass.

This rim 6 comprises a body in the form of a ferrule 64 (FIG. 1) that bears fixed beading 61 for supporting one of the beads of the tire and movable beading 60 for supporting the other bead.

The movable beading 60 is slidably mounted on the ferrule 64 and is removable therefrom. The rim 6 also comprises a locking system 35 for maintaining the movable beading 60 on the ferrule 64 and for limiting the maximum spacing between the two beadings 60, 61.

The locking system 35 is composed of a support washer 36 for the movable beading 60, itself slidably mounted on the ferrule 64 and removable therefrom, and a removable locking crown 37 which attaches rigidly to the ferrule 64. The crown 37 forms in its "fixed" position a limit on the ferrule 64 from the position of the movable beading 60 to the exterior of the rim, forming a stop for the washer 36 against which the movable beading 60 bears, directly or via a strut 38. Specifically, it is easy to arrange for the use of dimensional tubular struts provided between the support washer and the locking crown. Such struts make it possible to wedge the rim over the nominal distance of intermediate bead wires corresponding to each size of tires and, thus, to permit, by a simple change of strut, the use of the same rim for tires of different sizes for a given range.

Various possibilities may be envisaged for producing the locking crown 37, such as fingers borne on the crown and oriented radially towards the interior of the crown, which engage with orifices in the form of gaps pierced into the ferrule 64. After introducing the fingers into the orifices, a simple rotation of the crown 37 makes it possible to axially lock the crown on the ferrule 64. Such an embodiment and also a variant thereof are described in greater detail in paragraphs 00041 and 00047 of the aforementioned U.S. patent application Ser. No. 09/956,154, more particularly at the end of page 8 and at the start of page 9 with reference to FIGS. 3, 4, 5A, 5B and 6. This disclosure is incorporated herein by reference for all purposes.

Whichever locking system is chosen, the rim 6 also comprises an O-ring seal 40 whose diameter is less than that of the sealing ferrule 64 and which is installed by sliding into a circumferential housing 600 provided for this purpose and borne by the movable beading 60. Due to the effect of pressure during inflation, a pre-sealing between the movable beading 60 and the ferrule 64 is achieved by the O-ring seal 40, which suffices to allow the beadings 60, 61 to be separated until the support washer 36 comes into contact with the crown 37 or the strut 38, which brings about the final sealing of the system.

Furthermore, it is advantageous to allow for the presence on each rim beading 60, 61 of an O-ring seal 41 or flat seal positioned in a housing located at the base of the shoulder of the rim beadings 60, 61 so as to ensure the sealing of the connection between the rim beading/tire bead, even in the case where, during inflation, a bead is not totally pressed against the base of the shoulder.

Moreover, an orifice 65 connected to an air supply 66 is provided in the ferrule 64 so as to be able to inflate the carcass mounted on the rim.

The treading process, in particular the retreading process, using the device described previously in the first embodiment will be described with reference to FIG. 1.

Once the tread has been removed from the tire 1 to be retreaded, the tire 1 is mounted on the rim 6 and the carcass is inflated. Mounting on the rim from this stage makes it possible to use the same support, the rim 6, for all steps of the process. The rim can also be used to carry out the machining and repair operations, if any, of the tire.

In order to facilitate the manipulations, the rim 6 is positioned on a support, with its axis vertical, the fixed beading 61 facing downwards and the assembly of the movable beading 60 and the locking system 35 having been removed from the ferrule 64.

The tire carcass 2 is brought, with its axis vertical, over the rim 6 and the carcass is slid onto the ferrule 64 as far as the stop for the lower bead of the carcass, the bead 22 according to the figures, on the fixed beading 61.

The movable beading 60 is then placed on the ferrule 64 such that its face receiving the bead 21 is oriented towards the tire carcass 2. The beading 60 is left to slide, and descends naturally until it comes into contact with the bead 21. Similarly, on the one hand, the pre-greased O-ring seal 40 is placed on the ferrule 64, and the ferrule 64 is slid until it comes naturally into position in the circumferential housing 600 borne by the movable beading 60. On the other hand, the support washer 36 is inserted and abuts against the beading 60 and the seal 40.

The locking crown 37 is then presented on the ferrule 64 and is slid on the ferrule and then rotated in order to achieve the locking.

Once the rim 6 is locked, the carcass 2 is inflated by means of the fluid supply 66, which pushes the top bead 21, pushing back the movable beading 60 and the support washer 36 as far as the contact stop on the crown 37, the O-ring seal 40 then being compressed between the support washer 36 and the movable beading 60 and providing its final sealing.

These operations, which, as has been seen, do not require any specific precautions, but on the contrary constitute operations that are simple to perform, are sufficient to obtain the leaktight mounting of the carcass 2 on the rim 6.

Moreover, the cured tire will also be readily removable from the rim 6 since it is once again positioned vertically. After deflating the tire, the top bead resumes its initial position and releases all constraint on the locking crown 37, thus allowing it to be easily unlocked by rotating and then by sliding the various removable members towards the exterior of the rim.

Once the step of mounting and inflating the carcass 2 is complete, it is then rubberized by applying an uncured tread; for example by laying a rubber mix in the form of strips, preceded by laying an intermediate layer, commonly known as a "bonding rubber".

To apply the elastic mold 7 on the tire 1, the mold is first elongated circumferentially. Thus, the elastic mold 7 is stretched radially, especially by means of its wings 73, 74, such that its inside diameter is greater than the outside diameter of the tread 3. Advantageously, it is envisaged to treat the inner surface of the elastic mold 7 using a permanent non-stick agent so as to allow the stripping operation to be performed thereafter.

With the mold 7 maintained in its stretched position, the tire 1 is placed inside it so that the tread 3 is axially centered relative to the mold 7. The tensile force exerted on the mold 7 is then released, and the mold compresses onto the tread 3. As has previously been seen, the metallic inserts 18 distributed on the circumference of the mold 7 ensure the thickness of rubber that it is desired to maintain between the carcass 2 and the base of the tread designs, while at the same time promoting the radial extension of the mold when the inserts 18 are subjected to tensile forces.

Various known types of apparatus make it possible to achieve the separation and the maintenance in position of the mold during this operation.

During operation, the wings 161, 162 of the sleeve 16 may be folded onto the sleeve, and thus onto the crown of the mold, or may remain free, and thus lying on the shoulders 73, 74 of the mold. However, it is preferable, before laying the flanges 8, 9, to fold the wings 161, 162 onto the sleeve 16 so as to facilitate thereafter the connection between the flanges 8, 9 and the sleeve 16.

To install the elastic flanges 8 and 9 on the tire 1, the process may be performed in two steps consisting in positioning the tire 1 and its rim 6 with the axis vertical so as to achieve flat laying of the first flange, and then to turn over the assembly of the tire on the rim to apply the second flange. It is also possible to lay the second flange without turning over the tire, by allowing for sufficient accessibility under the tire. Since these installation operations are identical, the installation of only one flange will be described.

As the flange 8 is disc-shaped, it suffices to arrange it on the accessible sidewall of the tire, the end 81 being in contact first with the surface 611 via its flange 811 and the end 82, bearing the connecting member 33, being radially at the same level as the crown of the mold 7 or slightly passing beyond said level radially.

The ring 30 is then positioned on the flange 811 so as to secure the leaktight connection between the rim 6 and the flange 8, after which the wing 162 of the sleeve 16 is folded over onto the connecting member 33 and onto the peripheral end 82 of the flange 8, the tension device 32 being in place on the flange 8. The rigidity of the flange 8 allows these simple connections to keep it in contact with the mold and the tire.

Once the flanges 8 and 9 have been inserted, the air between the mold 7, the flanges 8, 9 and the tire 1 is removed by means of the valve 17, which valve also serves later to remove the vulcanization gases. Specifically, it is essential to evacuate the air trapped between the tread 3 and the mold 7 so as to obtain good reproducibility and good moldability of the tread designs of the tread.

The sleeve 16 is pressed into the space left free at the time of inserting the flanges 8, 9 between the connecting member 33, the mold 7 and the sleeve.

The assembly of the tire 1 and the retreading device 5 may then be placed in an oven, so as to vulcanize the tread. A positive differential pressure between the inside of the tire and the oven is maintained by any suitable system.

During the molding stage, in which the elastic mold 7 enters the tread 3 and in which its diameter reduces, the fold formed by the sleeve 16 between the member 33 and the mold 7, as specified a little earlier, makes it possible to ensure the leaktightness of the device. The stress that is then exerted on the sleeve 16 is small enough not to impair its wear resistance. Thus, the sleeve 16 and the flanges 8 and 9 can have a long service life.

When the vulcanization operation is complete, the assembly of the cured tire and the retreading device is removed from the oven. It is then very easy to remove the two flanges and then, by using the same apparatus as previously, to stretch the mold so as to remove therefrom the retreaded tire mounted on its rim, the subsequent removal from the said rim not, incidentally, posing any difficulties, as has already been pointed out.

What is claimed is:

1. A device for treading a vulcanized tire carcass using an uncured tread, comprising:
    a rim for mounting the carcass;
    an elastic annular mold whose circumferential outer surface is covered with an elastic sleeve, the mold being intended to mold the uncured tread; and
    two disc-shaped elastic flanges intended to cover, respectively, one sidewall of the assembly composed of the constituted tire covered with the mold, each flange having a larger-diameter peripheral end and a smaller-diameter peripheral end;
    the larger-diameter peripheral end of each flange bearing a rigid annular member far connection with the sleeve covering the mold.

2. The device according to claim 1, in which each rigid annular member makes an elastic connection between the sleeve covering the mold and the flange bearing said member.

3. The device according to claim 1, in which the elastic sleeve covering the mold has wings extending circumferentially and able to cover the larger-diameter peripheral end of each flange, each wing having a free end bearing an annular radial tension device.

4. The device according to claim 1, in which the flanges are made of butyl rubber.

5. The device according to claim 1. in which the smaller-diameter peripheral end of each disc-shaped flange includes a cylindrical flange for fixing onto the run via a ring.

6. The device according to claim 1, wherein each of the disc-shaped flanges compromises a cylindrical flange for fixing onto the rim, and each of the cylindrical flanges engages, respectively, with a surface borne by a corresponding rim beading.

7. The device according to claim 1, in which the rim comprises a one-piece body in the form of a ferrule on which is mounted a fixed beading for supporting a bead of the tire carcass, and a beading for supporting the other bead sliding axially on the ferrule and removable therefrom, the rim also comprising a lacking system for limiting the maximum separation of the beadings from each other, the carcass being inflated by the direct action of a fluid on its inner walls.

8. The device according to claim 7, in which the locking system comprises a washer for supporting the sliding beading, itself slidably mounted on the ferrule, and a locking crown that engages with the ferrule.

* * * * *

UNITED STATES PATENT AND TRADEMARK OFFICE
CERTIFICATE OF CORRECTION

| | |
|---|---|
| PATENT NO. | : 6,916,163 B2 |
| APPLICATION NO. | : 10/392523 |
| DATED | : July 12, 2005 |
| INVENTOR(S) | : François Chamoy |

Page 1 of 1

It is certified that error appears in the above-identified patent and that said Letters Patent is hereby corrected as shown below:

<u>COLUMN 10</u>

Line 5, "far" should read --for--; and
    Line 23, "compromises" should read --comprises--.

Signed and Sealed this

Twelfth Day of December, 2006

JON W. DUDAS
*Director of the United States Patent and Trademark Office*